United States Patent [19]

Kimura

[11] Patent Number: 5,399,848
[45] Date of Patent: Mar. 21, 1995

[54] PORTABLE TYPE SEMICONDUCTOR STORAGE APPARATUS

[75] Inventor: Masatoshi Kimura, Itami, Japan

[73] Assignee: Mitsubishi Denki Kabushiki Kaisha, Tokyo, Japan

[21] Appl. No.: 174,177

[22] Filed: Dec. 29, 1993

Related U.S. Application Data

[63] Continuation of Ser. No. 824,150, Jan. 22, 1992, abandoned.

[30] Foreign Application Priority Data

Feb. 1, 1991 [JP] Japan .................. 3-031430

[51] Int. Cl.⁶ ............................................ G06K 19/06
[52] U.S. Cl. ........................ 235/492; 235/441; 235/436; 365/229
[58] Field of Search ............ 235/492, 441, 436, 437, 235/438; 365/195, 228, 229

[56] References Cited

U.S. PATENT DOCUMENTS

| | | | |
|---|---|---|---|
| 4,587,640 | 5/1986 | Saitóh | 365/229 |
| 4,669,066 | 5/1987 | Kagawa et al. | 365/229 |
| 4,777,626 | 10/1988 | Matsushita et al. | 365/229 |
| 4,782,468 | 11/1988 | Jones et al. | 365/229 |
| 4,849,944 | 7/1989 | Matsushita | 365/201 |
| 5,016,223 | 5/1991 | Kimura et al. | 365/229 |
| 5,175,840 | 12/1992 | Sawase et al. | 365/228 |

Primary Examiner—Donald Hajec
Assistant Examiner—Esther H. Chin
Attorney, Agent, or Firm—Leydig, Voit & Mayer

[57] ABSTRACT

A portable semiconductor data storage apparatus includes a memory for storing data, a plurality of input-/output signal lines connected to the memory, the input/output signal lines being connected to a terminal machine when the data storage apparatus is inserted into the terminal machine, a removal detection circuit for generating a removal signal before disconnection of the input/output signal lines from the terminal machine when the data storage apparatus is removed from the terminal machine, and an access inhibition circuit for maintaining access to the memory until a read or write cycle during which the removal signal is generated by the removal detection means ends and for inhibiting access to the memory beginning from the next read or write cycle after the removal signal was generated.

2 Claims, 5 Drawing Sheets

PORTABLE TYPE SEMICONDUCTOR STORAGE APPARATUS

This disclosure is a continuation of application Ser. No. 07/824,150, filed Jan. 22, 1992, now abandoned.

BACKGROUND OF THE INVENTION

1. FIELD OF THE INVENTION

The present invention relates to a portable type semiconductor data storage apparatus and a method of protecting data stored in that data storage apparatus. Particularly, the present invention pertains to means for preventing erroneous writing in and reading out of data which may occur while data in the portable type semiconductor data storage apparatus is being accessed and the apparatus is removed from or inserted into a terminal machine.

2. DESCRIPTION OF THE RELATED ART

FIG. 6 shows the circuit configuration of a conventional portable type semiconductor storage apparatus. A cell 6 is connected to a volatile memory 1 through an internal power line 11 for supplying power from a power source, a reverse charge preventing diode 4 and a current limiting resistor 5. A power input line 10 is connected to the internal power line 11 through a reverse-flow preventing diode 2. An address bus 12, a data bus 13, an output enable signal line 14 and a write enable signal line 15 are also connected to the volatile memory 1. A chip enable signal line 16 is also connected to the volatile memory 1 through a three-state non-inverter 19a. A power control circuit 3 is connected between the power input line 10 and the three-state non-inverter 19a. In FIG. 6, reference numerals 7a and 8 denote pull-down resistors, and a reference numeral 9 denotes a pull-up resistor.

When used, the storage apparatus of the aforementioned configuration is mounted on a terminal machine (not shown). Once the storage apparatus is mounted on a terminal machine, power is supplied through the power input line 10 and the diode 2 to the internal power line 11. When the voltage on the power input line 10 is not higher than a predetermined value, the protect signal output from the power control circuit 3 to the three-state non-inverter 19a is at "L" level. Consequently, the non-inverter 19a is in a disabled state, and the terminal machine thus cannot gain access to the memory 1. Thereafter, the voltage on the power input line 10 gradually rises and reaches the predetermined value. At that time, the protect signal output from the power control circuit 3 rises to the "H" level, and the non-inverter 19a is thereby enabled. The memory 1 becomes accessible by the terminal machine.

When no power is supplied to the power input line 10 from the terminal machine because of completion of access or because of non-operation of the storage apparatus, the protect signal from the power control circuit 3 is at "L" level. Consequently, the non-inverter 19a is in a disabled state, and access to the memory 1 is inhibited. At that time, no power is supplied to the memory 1 from the power input line 10. However, power is supplied from the cell 6 to the memory 1 through the resistor 5 and diode 4, and the data stored in the memory 1 is not thus destroyed on the removal of the storage apparatus from the terminal machine.

However, when the storage apparatus is removed from the terminal machine while the terminal machine is accessing the memory 1, a chattering waveform is generated over a very long period of time as compared with the access time on the address bus 12, data bus 13, output enable signal line 14, write enable signal line 15 and chip enable signal line 16 connected to the memory 1. The period during which chattering is generated is in general about several tens of ms, whereas the access time to the memory 1 is 250 ns at the longest. Therefore, the memory 1 cannot be timed correctly, and erroneous writing in or reading out of data may occur. In other words, the accuracy of the data accessed during the chattering cannot be guaranteed.

SUMMARY OF THE INVENTION

Accordingly, an object of the present invention is to provide a useful portable semiconductor data storage apparatus eliminating generation of erroneous writing in or reading out of data which could occur when the data storage apparatus is removed from or inserted into a terminal machine while the terminal machine is accessing data in the data storage apparatus.

Another object of the present invention is to provide a method of protecting data stored in a portable semiconductor data storage apparatus preventing generation of erroneous writing in or reading out of data which could occur when the data storage apparatus is removed from or inserted into a terminal machine while the terminal machine is accessing data in the data storage apparatus.

In order to achieve the above objects, according to one aspect of the present invention, there is provided a portable semiconductor data storage apparatus which comprises a memory for storing data, a plurality of input/output signal lines connected to the memory, the input/output signal lines being connected to a terminal machine when the storage apparatus is inserted into the terminal machine, a removal detection means for generating a removal signal before disconnection of the input/output signal lines from the terminal machine. When the data storage apparatus, is removed from the terminal machine, and access inhibition means for maintaining access to the memory until the removal signal generated by the removal detection means ends and for inhibiting access to the memory from a subsequent cycle until the removal signal is generated by the removal detection means.

According to another aspect of the present invention, there is provided a method of protecting data stored in a portable semiconductor data storage apparatus which comprises the steps of detecting removal of the storage apparatus from a terminal machine before disconnection of a plurality of input/output signal lines of the data storage apparatus from the terminal machine when the storage apparatus is removed from the terminal machine, and maintaining access to a memory incorporated in the data storage apparatus until a cycle for detecting removal ends and inhibiting access to the memory until a subsequent cycle.

DESCRIPTION OF THE PREFERRED EMBODIMENTS

Embodiments of the present invention will be described below with reference to the accompanying drawings.

Figure 1:
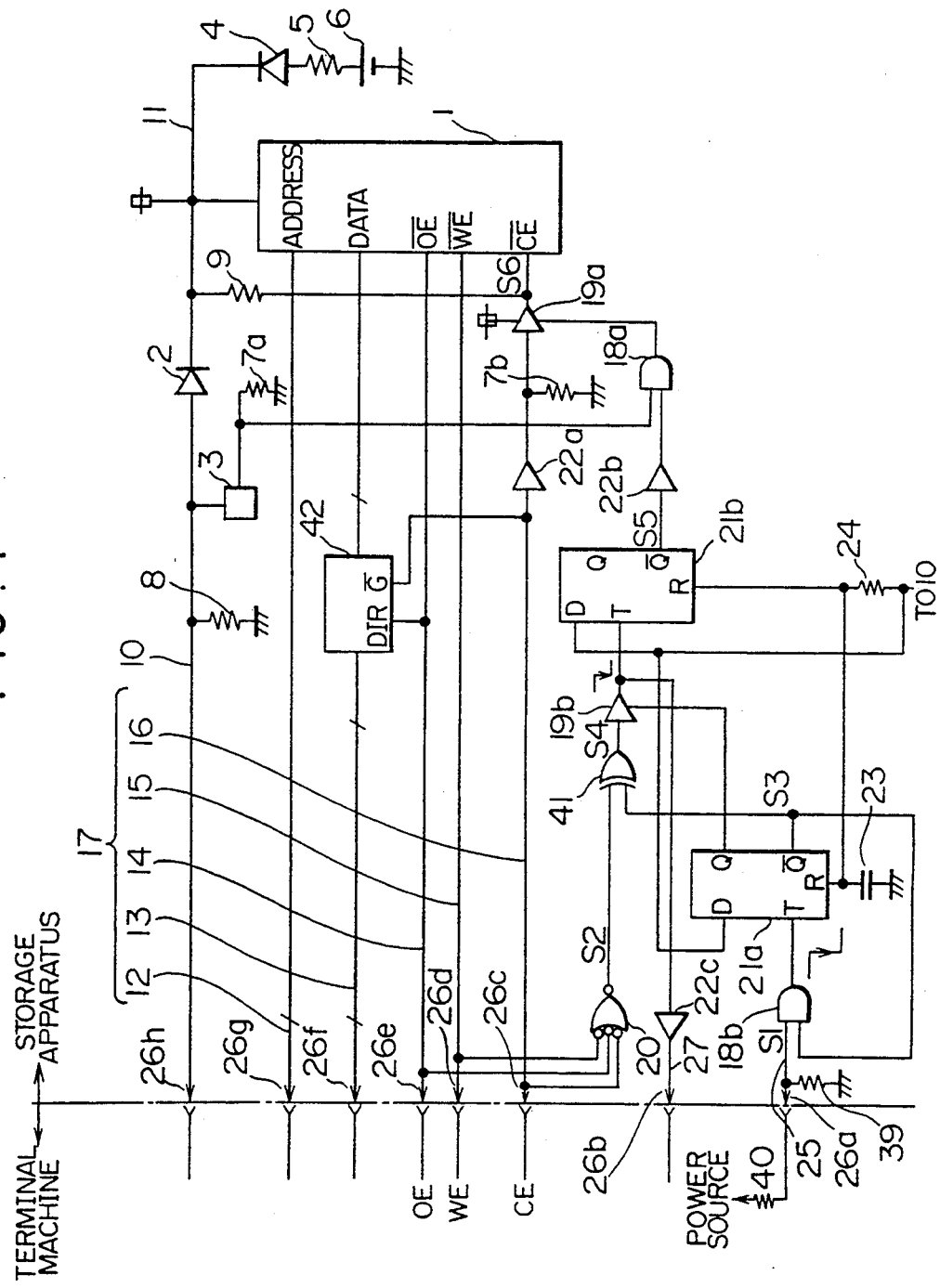
FIG. 1 is a circuit diagram of a first embodiment of a portable semiconductor data storage apparatus according to the present invention.

FIG. 1 shows a first embodiment of the portable semiconductor data storage apparatus according to the present invention. The storage apparatus incorporates the volatile memory 1. The cell 6 is connected to the volatile memory 1 through the internal power line 11 for supplying power from the power source, the reverse charge preventing diode 4 and the current limiting resistor 5. The power input line 10 is connected to the internal power line 11 through the reverse flow preventing diode 2. The address bus 12 and the output enable signal line 14 and the write enable signal line 15 are connected to the volatile memory 1. Also, the data bus 13 is connected to the volatile memory 1 through a three-state bidirectional buffer 42, and the chip enable signal line 16 is connected to the volatile memory 1 through the three-state non-inverter 19a and a non-inverter 22a. The power control circuit 3 and an AND circuit 18a are connected between the power input line 10 and the three-state non-inverter 19a.

The storage apparatus has a removal signal line 25 which is connected to a power source of a terminal machine through a pull up resistor 40 when the storage apparatus is inserted into the terminal machine. The removal signal line 25 is connected to a trigger input terminal of a D-type flip-flop circuit 21a through an AND circuit 18b. An AND circuit 20 is connected to the output enable signal line 14, to the write enable signal line 15 and to the chip enable signal line 16, and an EXCLUSIVE OR circuit 41 is connected to an output of the AND circuit 20 and to a $\overline{Q}$ output (inverted output) terminal of the flip-flop circuit 21a. The output of the EXCLUSIVE OR circuit 41 is connected to a trigger input terminal of a D type flip-flop circuit 21b through a three-state non-inverter 19b. A Q output terminal of the flip-flop circuit 21a is connected to the three-state non-inverter 19b. Both a D input terminal of the flip-flop circuit 21a and a D input terminal of the flip-flop circuit 21b are connected to the power input line 10, and both a reset terminal of the flip-flop circuit 21a and a reset terminal of the flip-flop circuit 21b are connected to the power input line 10 through a reset resistor 24 and are grounded through a reset capacitor 23. A $\overline{Q}$ output terminal of the flip-flop 21b is connected to the AND circuit 18a through a non-inverter 22b. An interrupt signal line 27 is connected to the output terminal of the three-state non-inverter 19b through a non-inverter 22c.

Figure 7:
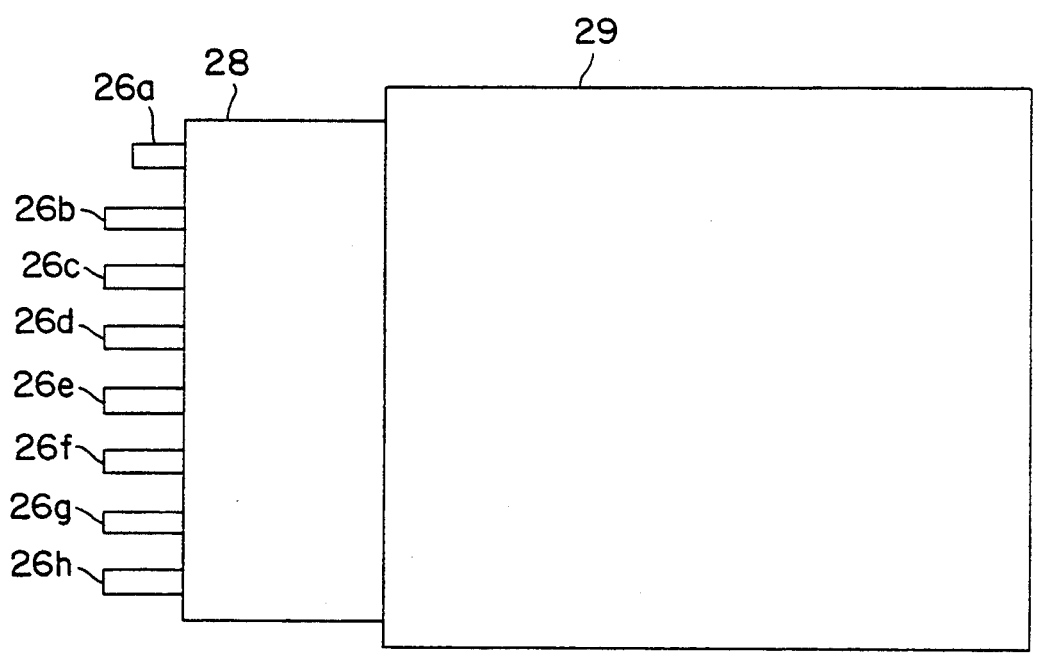
FIG. 7 is a plan view of a data storage apparatus according to the invention.

The removal signal line 25, the interrupt signal line 27, the chip enable signal line 16, the write enable signal line 15, the output enable signal line 14, the data bus 13, the address bus 12 and the power input line 10 are respectively connected to pins 26a to 26h of a connector 28 connected to data storage apparatus circuitry on a card 29, as schematically shown in FIG. 7. A distal end of the pin 26a connected to the removal signal line 25 is shorter than those of the other pins 26b to 26h by, for example, 0.5 mm or more. Therefore, when the storage apparatus inserted in the terminal machine is removed from the terminal machine, the pin 26a is disconnected from the terminal machine earlier than the other pins 26b to 26h. A pull down resistor 39 having a resistance far larger than that of the pull up resistor 40 incorporated in the terminal machine is connected to the removal signal line 25. Hence, a "H" level removal signal S1 is generated on the removal signal line 25 when the pin 26a is connected to the terminal machine, and a "L" level removal signal S1 is generated when the pin 26a is disconnected from the terminal machine.

The chip enable signal line 16, the write enable signal line 15, the output enable signal line 14, the data bus 13 and the address bus 12 in combination form a plurality of input/output signal lines 17, and the pin 26a, the removal signal line 25 and the pull down resistor 39 constitute a removal detection means. The flip-flop circuits 21a and 21b, the AND circuits 20 and 18a, the EXCLUSIVE OR circuit 41, the three-state non-inverters 19a and 19b and the non-inverter 22b form an access inhibition means. In FIG. 1, reference numerals 7a, 7b and 8 denote pull down resistors, and a reference numeral 9 denotes a pull up resistor.

The operation of this storage apparatus will now be described. When the storage apparatus shown in FIG. 1 is inserted into a terminal machine and power is thereby applied to the power input line 10, the Q output of the flip-flop circuit 21a falls to its "L" level while the $\overline{Q}$ output thereof rises to its "H" level, and the $\overline{Q}$ output of the flip-flop 21b rises to its "H" level and the output of the non-inverter 22b rises to its "H" level due to the resetting action achieved by the capacitor 23 and the resistor 24. When the voltage on the power input line 10 reaches a predetermined value, the signal output from the power control circuit 3 to the AND circuit 18a rises to its "H" level. Consequently, the output of the AND circuit 18a rises to its "H" level, and the three-state non-inverter 19a is thereby enabled. In this state, the memory 1 is accessible by the terminal machine for writing in and reading out of data.

Switch over between the writing in mode and the reading out mode is controlled by the bidirectional buffer 42. The bidirectional buffer 42 is designed such that it is enabled when the $\overline{G}$ input is low. The bidirectional buffer 42 switches over the direction of data flow depending on the logical state of a DIR input: the reading out mode is attained when the DIR input is at its "L" level and the writing in mode is attained when the DIR input is at its "H" level. When the $\overline{G}$ input is high, the input/output terminals are in a floating state.

Figure 2:
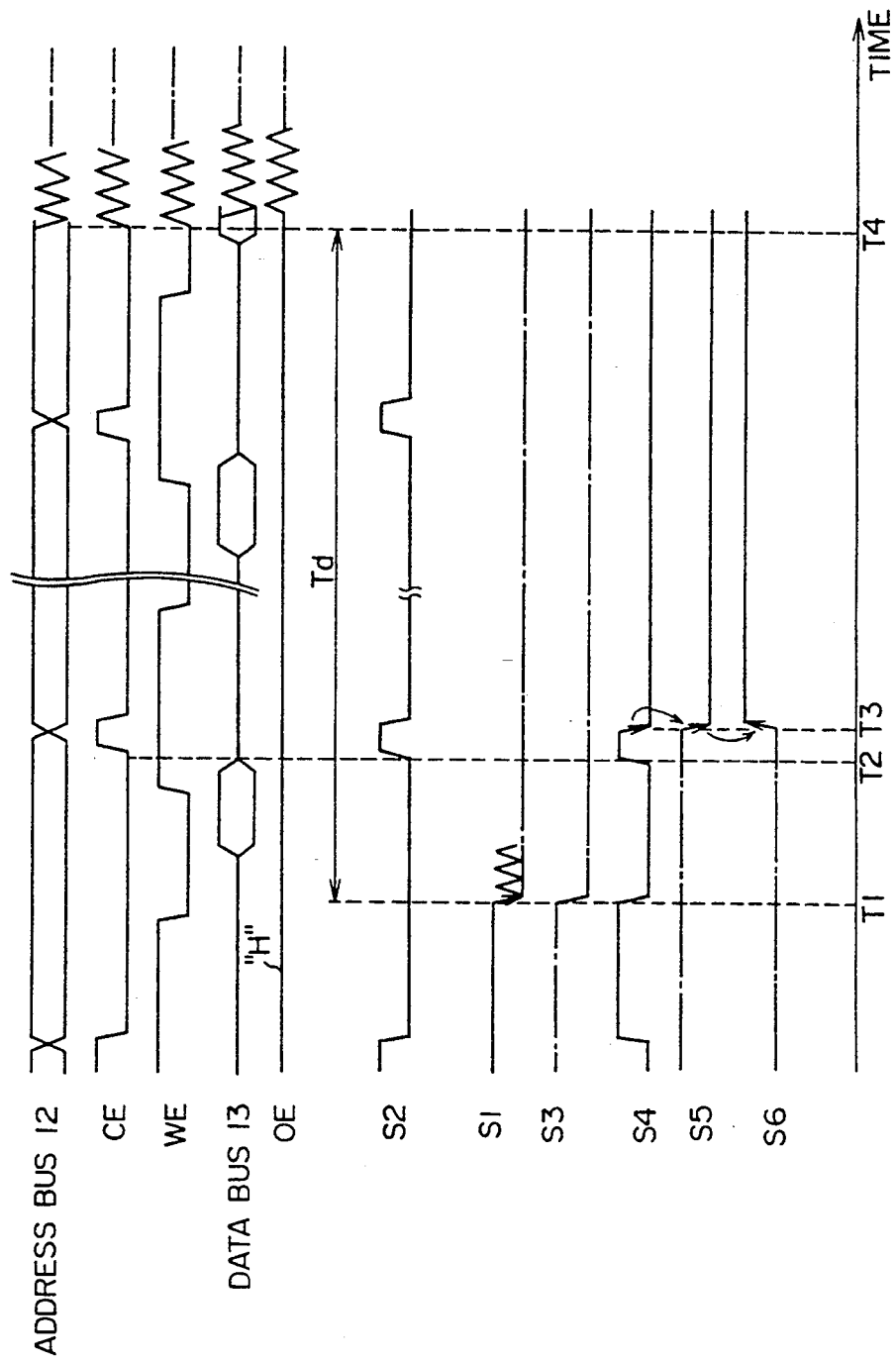
FIG. 2 shows how individual components are timed when data is written into the data storage apparatus of FIG. 1.

When data is written into the memory 1 by the terminal machine, writing timing is generated using the address bus 12, a chip enable signal CE, a write enable signal WE, the data bus 13 and an output enable signal OE in the manner shown in FIG. 2. During the access, the logical AND operation is performed by the AND circuit 20 on the output enable signal OE, write enable signal WE and chip enable signal CE, and the EXCLUSIVE OR operation is conducted on the output S2 of the AND circuit 20 and the $\overline{Q}$ output S3 of the flip-flop circuit 21a by the EXCLUSIVE OR circuit 41. At that time, as the Q output of the flip-flop circuit 21a is at its "L" level, as stated above, the three-state non-inverter 19b is in a disabled state, and an output S4 of the EX- CLUSIVE OR circuit 41 is thus not transmitted to the flip-flop circuit 21b.

Next, the case in which the data storage apparatus which is being accessed is removed from the terminal machine will be described. If a single writing in or reading out cycle is 1 μs long, and if the speed at which the storage apparatus is removed from the terminal machine is 2 m/s, a length ΔL of the pin through which the pin is removed during one cycle is 0.002 mm = 2 m/s × 1 μs. If the speed at which the storage apparatus is removed from the terminal machine is 10 m/s, ΔL = 10 m/s × 1 μs = 0.01 mm. As stated above, the pin 26a connected to the removal signal line 25 of the storage apparatus is shorter than the other pins 26b and 26h by 0.5 mm or more. Therefore, the time difference Td from the removal of the pin 26a from the terminal machine to the removal of the other pins 26b to 26h from the terminal machine when the storage apparatus is removed from the terminal machine is significantly larger than the time representing one writing in or reading out cycle.

Assuming that the pin 26a leaves the terminal machine at time T1 as a consequence of removal of the storage apparatus during the writing in of data by the terminal machine, the removal signal S1 on the removal signal line 25 falls to its "L" level in the moment that the pin 26a is disconnected from the terminal machine by the action of the pull down resistor 39. Thereafter, the removal signal S1 continues chattering. As a trigger signal having the logical "L" level is input to the flip-flop circuit 21a from the AND circuit 18b at time T1, the flip-flop circuit 21a latches the D input at the falling edge of the trigger signal. Consequently, the Q output of the flip-flop circuit 21a rises to its "H" level, and the three-state non-inverter 19b is thereby enabled. The $\overline{Q}$ output S3 of the flip-flop circuit 21a falls to its "L" level. Since the $\overline{Q}$ output S3 is input to the AND circuit 18b, the Q output and $\overline{Q}$ output S3 of the flip-flop circuit 21a maintain their levels even if the pin 26a is connected again to the terminal machine When the $\overline{Q}$ output S3 is low, the output S4 of the EXCLUSIVE OR circuit 41 is low while the output S2 of the AND circuit 20 is low. In other words, when the output enable signal OE is high in the writing cycle, the output S4 of the EXCLUSIVE OR circuit 41 is low while at least one of the write enable signal WE and the chip enable signal CE is low, and normal writing is conducted in this cycle.

Since both the write enable signal WE and the chip enable signal CE rise to their "H" level at time T2 when that cycle of the writing mode ends, the output S4 of the EXCLUSIVE OR circuit 41 also rises to its "H" level. At time T3 at which a subsequent cycle starts, the write enable signal WE and the chip enable signal CE and the output S4 of the EXCLUSIVE OR circuit 41 all fall to the logical "L" level, and the logical low level signal of the output S4 of the EXCLUSIVE OR circuit 41 is input to the trigger input terminal of the flip-flop circuit 21b. The flip-flop circuit 21b latches the D input upon the falling of its trigger signal, and the $\overline{Q}$ output S5 thereby falls to its "L" level. Consequently, the output of the non-inverter 22b falls to its low level, the output of the AND circuit 18a falls to its low level, and the three-state non-inverter 19a is disabled. As a result, a CE input S6 of the memory 1 is pulled up to the "H" level by means of the pull up resistor 9, and the access to the memory is thus inhibited. Thereafter, even when a signal train is input to the trigger input terminal of the flip-flop circuit 21b, the $\overline{Q}$ output S5 maintains the logical "L" level, and access to the memory remains inhibited.

When the output S4 of the EXCLUSIVE OR circuit 41 falls to its "L" level at time T3, this logical "L" level signal is output to the interrupt signal line 27 through the three-state non-inverter 19b and the non-inverter 22c, and then output to a CPU (not shown) of the terminal machine through the pin 26b which is still connected to the terminal machine at that point as an interrupt or hold signal, in response to which the terminal machine determines that the removal signal line 25 of the storage apparatus has been disconnected from the terminal machine.

Thereafter, the pins 26b to 26h are removed from the terminal machine at time T4.

As will be understood from the foregoing description, when the pin 26a is disconnected from the terminal machine while the chip enable signal CE is low, normal writing in that cycle is completed, and access to the memory is then inhibited starting from the subsequent cycle. When the pin 26a is disconnected from the terminal machine while the chip enable signal CE is high, since the output S4 of the EXCLUSIVE OR circuit 41 falls when the chip enable signal CE falls to its "L" level, access to the memory is inhibited without writing of data into the memory. When the chip enable signal CE is fixed at the "L" level and the write enable signal WE is used for access, access is inhibited at the falling edge of the write enable signal WE.

Figure 3:
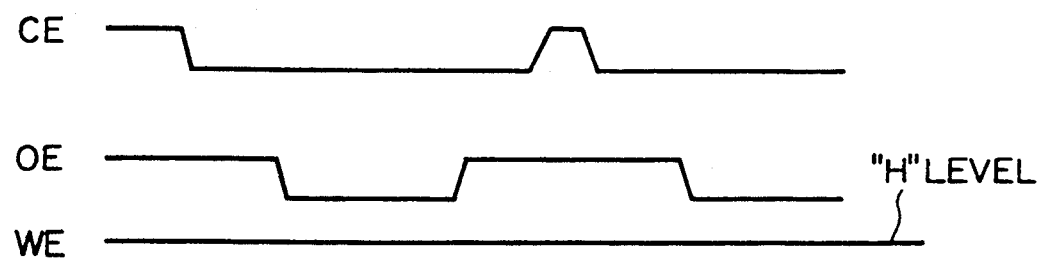
FIG. 3 shows how the individual components are timed when data is read out from the data storage apparatus of FIG. 1.

While data is being read out of the memory, the write enable signal WE is high, and the reading out timing is generated by the chip enable signal CE and the output enable signal OE, as shown in FIG. 3. When the storage apparatus is removed from the terminal machine while the terminal machine is accessing the memory in order to read data therefrom, the removal signal S1 is generated upon disconnection of the pin 26a from the terminal machine, as in the case where the memory is accessed for writing in data, and access is inhibited at the falling edge of the output S4 of the EXCLUSIVE OR circuit 41. That is, normal data reading out is continued until the cycle in which the removal signal S1 is generated ends, and access to the memory is then inhibited starting from the subsequent cycle.

Next, the case in which the data storage apparatus is inserted into a terminal machine which is on will be described. Until the power voltage applied to the power input line 10 of the storage apparatus reaches a predetermined value after the storage apparatus has been inserted into the terminal machine, the output of the AND circuit 18a is low by the action of the power control circuit 3, and the three-state non-inverter 19a is in a disabled state. Consequently, the CE input S6 of the memory 1 is high by the pulling up action of the pull up resistor 9, and access to the memory 1 is thus inhibited.

At that time, if the chip enable signal CE supplied from the terminal machine is high, even if the voltage on the power input line 10 rises to the predetermined value and the three-state non-inverter 19a is thereby enabled, the CE input S6 of the memory 1 is high, and the terminal machine is not adversely affected. While the data storage apparatus is disconnected from the terminal machine, since access to the storage apparatus is impossible, the chip enable signal CE sent from the terminal machine is generally high.

In this embodiment, no matter when access is made to the data storage apparatus by the terminal machine or when the data storage apparatus is removed from the terminal machine, normal access operation is conducted until the cycle in which removal occurs is completed, and access to the memory is then inhibited starting from the subsequent cycle. Consequently, erroneous writing in and reading out of data are prevented, and a highly reliable and convenient portable semiconductor data storage apparatus is therefore provided.

Figure 4:
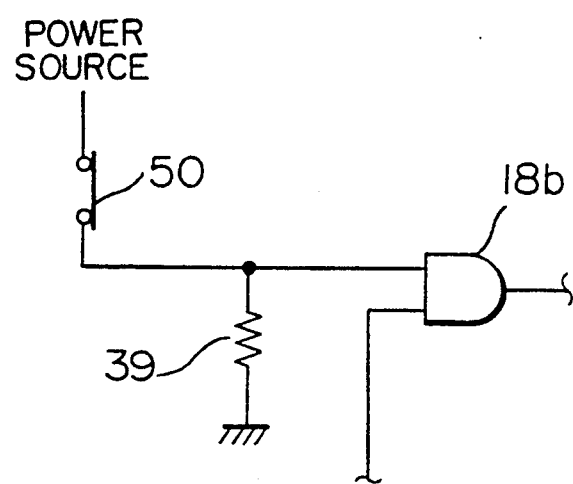
FIG. 4 is a circuit diagram of a second embodiment of the present invention.

In the above-described embodiment, the removal signal S1 is generated by making the pin 26a shorter than the other pins 26b to 26h. However, one end of a switch 50 may be connected to the pull down resistor 39 with the other end thereof connected to the power input line 10, as shown in FIG. 4. The switch 50 is activated prior to the disconnection of the pins 26b to 26h when the storage apparatus is removed from the terminal machine, and is opened. In this way, the removal signal S1 can be obtained, as in the aforementioned case.

Figure 5:
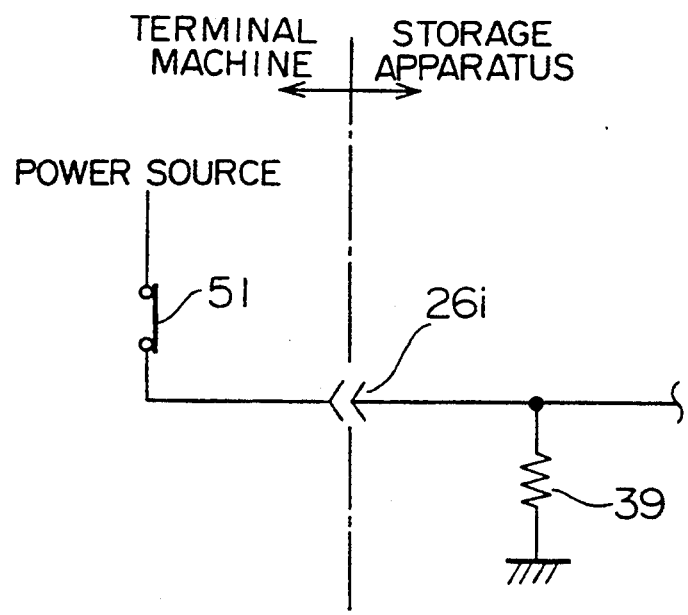
FIG. 5 is a circuit diagram of a third embodiment of the present invention.
Figure 6:
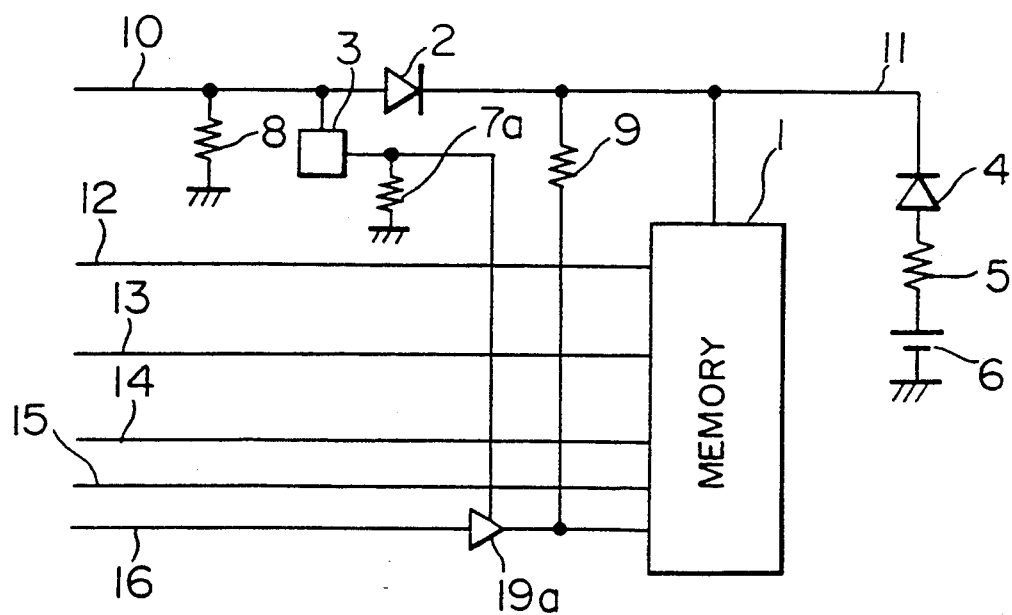
FIG. 6 is a circuit diagram of a conventional portable semiconductor data storage apparatus.

Alternatively, the pull down resistor 39 may be connected to a pin 26i having the same length as those of the other pins 26b to 26h while the power source is connected to a signal line in the terminal machine to which the pin 26i is connected with a switch 51 therebetween, as shown in FIG. 5. The switch 51 is actuated prior to the disconnection of the pins 26b to 26i when the storage apparatus is removed from the terminal machine and is opened, like the switch 50 shown in FIG. 4.

In the above-described embodiment, a volatile memory is used as the memory for storing data. However, a non-volatile memory can also be employed. In that case, the cell 6, the current limit resistor 5, the reverse charge preventing diode 4 and the write enable signal line 15 are unnecessary. To simplify description, a data storage apparatus in which the single memory 1 is incorporated has been described. However, the present invention can be applied to a data storage apparatus which incorporates a plurality of memories.

What is claimed is:

1. A portable semiconductor data storage apparatus comprising:
   a memory for storing data;
   a plurality of input/output signal lines connected to said memory including an address bus, a data bus, an output enable line, a write enable line, and a chip enable line, said input/output signal lines being connected to a terminal machine when said data storage apparatus is inserted into the terminal machine for reading stored data out of said memory in reading cycles and for writing data into said memory in writing cycles;
   removal detection means for generating a removal signal before disconnection of said plurality of input/output signal lines from the terminal machine when said data storage apparatus is removed from the terminal machine; and
   access inhibition means connected to said removal detection means for receiving the removal signal for maintaining said memory accessible for reading data from said memory and writing data into said memory until the respective reading or writing cycle during which a removal signal is generated by said removal detection means ends and for inhibiting access to said memory for reading stored data and writing data from the next reading or writing cycle after the reading or writing cycle during which the removal signal was generated by said removal detection means, said access inhibition means being connected to said output enable, write enable, and chip enable lines for detecting ending of the reading or writing cycle during which the removal signal has been generated.

2. The portable semiconductor data storage apparatus according to claim 1 comprising a plurality of first connector pins for connecting said plurality of input/output signal lines to the terminal machine, each first connector pin having a length, wherein said removal detection means includes a removal detecting connector pin having a length shorter than the lengths of said plurality of first connector pins and a pull down resistor connected to said removal detecting connector pin whereby, when said data storage apparatus is removed from the terminal machine, said removal detecting connector pin is disconnected from the terminal machine earlier than said plurality of first connector pins, thereby grounding said removal detecting connector pin through said pull down resistor, and the difference in the length of said removal detecting pin and the lengths of said plurality of first connector pins provides a delay between removal of said data storage apparatus and disconnection of said data storage apparatus from the terminal machine longer than a data read cycle and a data write cycle.

* * * * *